United States Patent
Wang et al.

(10) Patent No.: US 9,391,337 B2
(45) Date of Patent: Jul. 12, 2016

(54) COMPOSITE PROTON CONDUCTING ELECTROLYTE WITH IMPROVED ADDITIVES FOR FUEL CELLS

(71) Applicants: Daimler AG, Stuttgart (DE); Ford Motor Company, Dearborn, MI (US)

(72) Inventors: Keping Wang, Richmond (CA); Yunsong Yang, Surrey (CA); Jing Li, Surrey (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 0 days.

(21) Appl. No.: 14/855,789

(22) Filed: Sep. 16, 2015

(65) Prior Publication Data

US 2016/0006068 A1    Jan. 7, 2016

Related U.S. Application Data

(60) Division of application No. 13/508,594, filed as application No. PCT/EP2010/006836 on Nov. 10, 2010, now Pat. No. 9,172,107, which is a continuation-in-part of application No. 12/615,671, filed on Nov. 10, 2009, now abandoned.

(60) Provisional application No. 61/360,340, filed on Jun. 30, 2010.

(51) Int. Cl.
*H01M 4/00* (2006.01)
*H01M 8/10* (2016.01)

(52) U.S. Cl.
CPC .......... *H01M 8/1051* (2013.01); *H01M 8/1023* (2013.01); *H01M 8/1039* (2013.01); *H01M 8/1048* (2013.01); *H01M 2008/1095* (2013.01); *H01M 2250/10* (2013.01); *H01M 2250/20* (2013.01); *H01M 2300/0082* (2013.01); *Y02E 60/521* (2013.01)

(58) Field of Classification Search
CPC ............ H01M 8/1023; H01M 8/1039; H01M 2300/0082
USPC ..................................... 324/207.25
See application file for complete search history.

(56) References Cited

U.S. PATENT DOCUMENTS

| | | | | |
|---|---|---|---|---|
| 5,491,632 | A * | 2/1996 | Pawlak et al. ............... | 701/1 |
| 2002/0005715 | A1 * | 1/2002 | Sato ......................... | 324/207.2 |
| 2002/0179825 | A1 * | 12/2002 | Lin et al. .................. | 250/231.14 |
| 2009/0033321 | A1 * | 2/2009 | Kurihara ................... | 324/207.25 |
| 2009/0201014 | A1 * | 8/2009 | Cavallo ..................... | 324/207.25 |
| 2010/0045275 | A1 * | 2/2010 | Frachon .................... | 324/207.24 |

* cited by examiner

*Primary Examiner* — Mark F Huff
*Assistant Examiner* — Monique Wills
(74) *Attorney, Agent, or Firm* — Patent Central LLC; Stephen A. Pendorf (57) ABSTRACT

Additives can be used to prepare polymer electrolyte for membrane electrode assemblies in polymer electrolyte fuel cells in order to improve both durability and performance. The additives are chemical complexes comprising certain metal and organic ligand components.

12 Claims, 4 Drawing Sheets

COMPOSITE PROTON CONDUCTING ELECTROLYTE WITH IMPROVED ADDITIVES FOR FUEL CELLS

CROSS REFERENCE TO RELATED APPLICATIONS

This application is a divisional of U.S. Ser. No. 13/508,594 filed Sep. 6, 2012, which is a National Stage Entry of International Application Number PCT/EP2010/006836 filed Nov. 10, 2010, which is a Continuation of U.S. application Ser. No. 12/615,671 filed Nov. 10, 2009 and provisional U.S. Ser. No. 61/360,340 filed Jun. 30, 2010. The entire contents of PCT/EP2010/006836 and Ser. Nos. 12/615,671 and 61/360,340 are incorporated herein by reference.

BACKGROUND

1. Field of the Invention

This invention relates to additives for the proton conducting polymer electrolyte used in membranes, catalyst layers, and the like in fuel cells. In particular, it relates to additives for improved durability and performance thereof.

2. Description of the Related Art

Proton exchange membrane fuel cells (PEMFCs) convert reactants, namely fuel (such as hydrogen) and oxidant (such as oxygen or air), to generate electric power. PEMFCs generally employ a proton conducting polymer membrane electrolyte between two electrodes, namely a cathode and an anode. A structure comprising a proton conducting polymer membrane sandwiched between two electrodes is known as a membrane electrode assembly (MEA). MEA durability is one of the most important issues for the development of fuel cell systems in either stationary or transportation applications. For automotive applications, an MEA is required to demonstrate durability of about 6,000 hours.

The membrane serves as a separator to prevent mixing of reactant gases and as an electrolyte for transporting protons from anode to cathode. Perfluorosulfonic acid (PFSA) ionomer, e.g., Nafion®, has been the material of choice and the technology standard for membranes. Nafion® consists of a perfluorinated backbone that bears pendent vinyl ether side chains, terminating with $SO_3H$.

Failure of the membrane as an electrolyte will result in decreased performance due to increased ionic resistance, and failure of the membrane as a separator will result in fuel cell failure due to mixing of anode and cathode reactant gases. The chemical degradation of PFSA membrane during fuel cell operation is proposed to proceed via the attack of hydroxyl (.OH) or peroxyl (.OOH) radical species on weak groups (such as a carboxylic acid group) on the ionomer molecular chain. The free radicals may be generated by the decomposition of hydrogen peroxide with impurities (such as $Fe^{2+}$) in a Fenton type reaction. In fuel cells, hydrogen peroxide can be formed either at Pt supported on carbon black in the catalyst layers or during the oxygen reduction reaction.

The hydroxyl radical attacks the polymer unstable end groups to cause chain zipping and/or could also attack an $SO_3^-$ group under dry conditions to cause polymer chain scission. Both attacks degrade the membrane and eventually lead to membrane cracking, thinning or forming of pinholes. The membrane degradation rate is accelerated significantly with increasing of the operation temperature and with decreasing inlet gas relative humidity (RH).

Different additives to the membrane electrolyte have been studied for purposes of improving the performance and/or durability of the membrane. These additives include: 1) hygroscopic particles made of metal oxide, such as silica or zirconium dioxide, heteropoly acids, phosphonate silica, etc. to improve MEA performance under low RH conditions by increasing water retention (e.g. US20070154764); 2) Pt catalyst particles dispersed in the electrolyte membrane to improve membrane durability as well as membrane performance under low RH (e.g. US20070072036); 3) metal elements or compositions containing metal elements or metal alloys that act as a free radical scavenger or hydrogen peroxide decomposition catalyst (e.g. US2004043283); 4) phenol type antioxidants where the antioxidant can be a small molecule or a polymer (e.g. US2006046120); 5) organic crown compounds (e.g. US20060222921) or macrocyclic compounds containing metal or metalloids (e.g. WO2007144633); and 6) cation chelating agents to reduce formation of free radicals (e.g. U.S. Pat. No. 6,607,856).

Additives are also disclosed in WO2005060039 to address the problem in PEM fuel cell durability of premature failure of the ion-exchange membrane. The degradation of the ion-exchange membrane by reactive hydrogen peroxide species can be reduced or eliminated by the presence of an additive in the anode, cathode or ion-exchange membrane. The additive may be a radical scavenger, a membrane cross-linker, a hydrogen peroxide decomposition catalyst and/or a hydrogen peroxide stabilizer. The presence of the additive in the membrane electrode assembly (MEA) may however result in reduced performance of the PEM fuel cell. In particular, suggested additives include an organometallic Mn(II) or Mn(III) complex having an organic ligand selected from CyDTA, ENTMP, gluconate, N,N'-bis(salicylidene)propylenediamine, porphyrins, phthalocyanines, phenanthroline, hydrazine, pyrocatechol-3,5-disulphonic acid disodium salt, triethylenetetraamine, shill base macrocycles and EDDA.

In commonly owned U.S. patent application Ser. No. 12/615,671, with the title "Composite Proton Conducting Membrane with Low Degradation and Membrane Electrode Assembly for Fuel Cells" and filed on Nov. 10, 2009, certain ligand additives (e.g. 1,10-phenanthroline or 2,2'-bipyridine) were disclosed that meet many of these needs. The use of these ligand additives in the membrane and/or catalyst layers can improve durability but, depending on testing conditions, there may be a modest penalty in fuel cell performance (e.g. 3 times better stability might be obtained but with a 20 mV loss in voltage under load). Preferably, both durability and performance of fuel cells would be improved with appropriate additives.

Accordingly, there remains a need for improved additive technology that provides additional resistance of MEAs, and specifically PFSA membranes of the MEAs, to degradation, resulting in improved MEA durability and performance under low RH in a fuel cell. This invention fulfills these needs and provides further related advantages.

SUMMARY

It has been discovered that using certain metal-ligand complex additives in a composite polymer electrolyte can provide durability benefits without the performance loss associated with using the additives of the aforementioned prior art. Herein, the complex additives are denoted as (metal)(ligand) where (metal) refers to the metal component and (ligand) refers to the organic ligand component in the complex additive. The composite polymer electrolyte thus comprises a proton conducting ionomer and an amount of a (metal)(ligand) complex additive.

The metal component in the additives of the invention includes a suitable metal in elemental form or as part of another molecule. Thus, (metal) may represent an appropriate metal, metal alloy, metal oxide, metal salt or any combination thereof. Precursors for the (metal) may include Pd, Pt, platinum supported on carbon, $Pt(NH_3)_4(NO_3)_2$, $PtCl_4$, Mn, Co, Rh, Cu, Os, Ni, Ir, Ag, Ti, Ce, Ru, Cr, Zr, Fe, $CeO_2$, $RuO_2$, $WO_3$, $CePO_4$, $CrPO_4$, $AlPO_4$, $CeF_3$, $SiO_2$, $Ce(NO_3)_3 \cdot 6H_2O$, $Ce(SO_4)_2$, $MnO_2$, $Mn_2O_3$, MnO, $MnSO_4$, $MnCl_2$, $Mn(CH_3COO)_2 \cdot 4H_2O$, $Mn(NO_3)_2$, $CoCl_2$, $Co(NO_3)_2$, $CoBr_2$, $Co_3(PO_4)_2$, $Co(CH_3COO)_2$, $CoSO_4$, $Co(H_2PO_4)_2$, $NiF_2$, $NiSO_4$, $NiBr_2$, $NiCl_2$, $Ni_3(PO_4)_2$, $Ni(CH_3COO)_2$, $Ni(OH)_3$, $Ni_2O_3$, NiO, $Fe_3O_4$, $Fe_2O_3$, $FeCl_2$, $FeCl_3$, $Ce(NO_3)_3$, $ZnO_2$, $ZnCl_2$, $Zn(NO_3)_2$, $TiF_2$, $TiF_4$, CuCl, $CuCl_2$, $CuSO_4$, Cu—Ni alloy, Pt—Co alloy, Pt—Au alloy, and $RuO_2$—$Al_2O_3$. Particularly preferred metals in the (metal) component are Mn, Ce, Co, Fe, Cu, Pd, Pt, Pt—Co, or their ions.

The (ligand) component in the additives are certain small organic molecules, or polymers or copolymers thereof, in which the molecules comprise at least two nitrogen atoms in their structure that are capable of forming a complex with a metal or metal ion. In particular, the ligand can be selected from the group consisting of molecules having the following chemical structures:

where
$R_1$ is H, $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH, or wherein X is H, COOH, $PO(OH)_2$ or $SO_3H$, and n is an integer from 0 to 10;
$R_3$ and $R_4$ can be any of the same groups as $R_1$; and
$R_2$ can be any of the same groups as $R_1$ except for H (hydrogen).

And preferably, all of $R_1$, $R_2$, $R_3$, and $R_4$ are selected from groups which can enhance π conjugation of the ligand (e.g. amino or phenyl groups). Preferred ligand components thus include bathophenanthroline or 1,10-phenanthroline-5-amino. Such ligand components have $R_1$, $R_2$ groups with greater π conjugation ability than certain additives suggested in the prior art. Other preferred ligand components include terpyridine, where $R_1$=H.

While various molar ratios may be considered, preferred molar ratios for the (metal) to (ligand) components in the additive are from about 1:1 to 1:5. It may be useful to employ an excess of (ligand) component in the additive in order to deactivate Fenton ion impurities (by forming complexes therewith) in the membrane electrolyte. And as demonstrated in the Examples to follow, the additives can be effective and show improvement in both performance and durability at levels from about 0.5%, 1%, and up (with respect to the weight of the proton conducting ionomer) when incorporated into a composite polymer electrolyte.

The additive can be used in the preparation of a composite PFSA or hydrocarbon electrolyte to improve durability and performance of fuel cells. The composite polymer electrolyte comprises a conventional perfluorosulfonic acid ionomer or hydrocarbon ionomer plus a suitable amount of additive.

One method for preparing such a composite is to first synthesize the additive from desired starting ligands and metal precursors. The improved electrolyte composite can then be prepared by dissolving the synthesized complex additive in a conventional PFSA ionomer dispersion or hydrocarbon ionomer solution. The composite dispersion/solution can then be used to cast membrane electrolyte or to prepare catalyst layers as desired.

Alternatively however, the additive can be prepared in-situ, such as by mixing suitable starting ligands and metal precursors into a dispersion or solution of a desired conventional ionomer. Where possible, this procedure is preferred as it saves preparation steps.

Depending on the starting materials used, method of synthesis, and polymer type employed, counter ions (e.g. Cl⁻) may also be associated with the complex additives of the invention.

The invention therefore includes composite electrolyte materials comprising the aforementioned additives, fuel cells comprising such materials such as in membrane or catalyst layers, and methods of preparing such composite electrolytes, membranes, catalyst layers, and fuel cells.

These and other aspects of the invention are evident upon reference to the attached Figures and following detailed description.

DETAILED DESCRIPTION

The presently disclosed additives can be used in the membrane, an ionomer of an electrode (cathode and/or anode), and/or in a spray coating on gas diffusion electrode (GDE) surfaces in a solid polymer electrolyte fuel cell.

The additives comprise a metal component and a ligand component wherein the metal component and the ligand component form a complex. For purposes of forming a suitable complex, the ligand component comprises at least two atoms which are capable of complexing with the metal in the metal component, e.g. nitrogen. Several ligand components comprising two or more such nitrogen atoms have been demonstrated effective in the Examples to follow.

Figure 1:
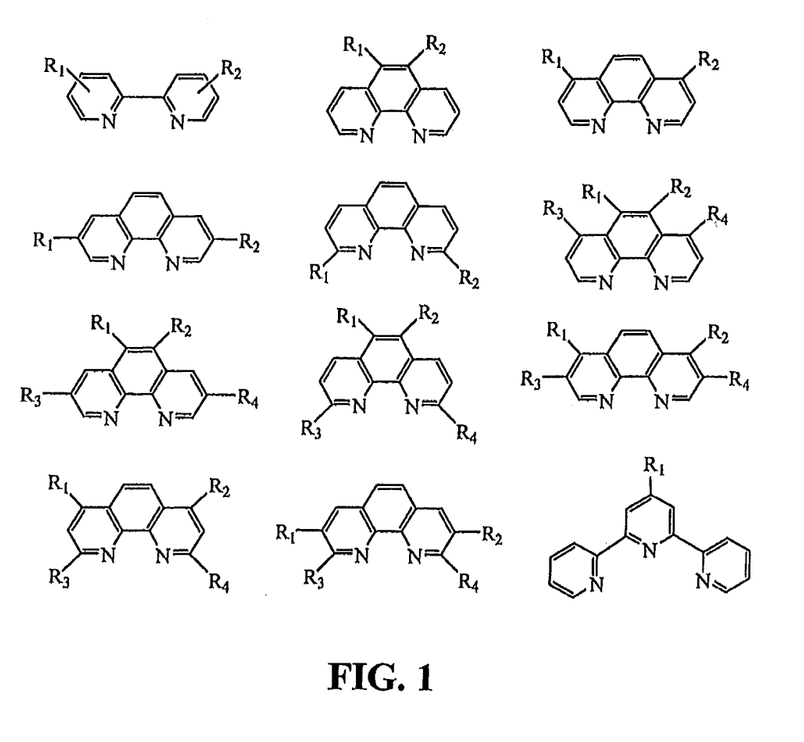
FIG. 1 shows the chemical structures of exemplary ligand components for the additives of the invention.

In addition, the ligand components in the additives are small organic molecules or polymers and/or copolymers with functional groups which can also coordinate with metal ions. The ligands are soluble in a PFSA ionomer dispersion or hydrocarbon ionomer solutions. The (ligand) can be selected from the group consisting of molecules having the chemical structures depicted in FIG. 1 where
$R_1$ is H, $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH, or wherein X is H, COOH, $PO(OH)_2$ or $SO_3H$ and n is an integer from 0 to 10;
$R_3$ and $R_4$ can be any from the same groups as $R_1$; and
$R_2$ can be any of the same groups as $R_1$ except for H (hydrogen).

All of $R_1$, $R_2$, $R_3$ and $R_4$ are preferably selected to be good electron donors (e.g. amino or phenyl groups). Preferred (ligand) components include bathophenanthroline, 1,10-phenanthroline-5-amino, and terpyridine.

With regard to employing polymer ligands in the additives, the complex forming units can be either on the polymer backbone or on side chains. The additives can be homopolymers of complex forming units or copolymers of complex forming units with an aromatic structure (such as poly(ether ketone), poly(ether sulfone), poly(phenylene), etc). Copolymers can be random or block copolymers. When a complex forming unit is on the polymer side chain, it can be directly attached to the polymer backbone or attached via a spacer. The polymer backbone can be an aromatic, semi- or perfluoro aliphatic polymer. On each side chain, there can be one complex forming unit or multiple complex forming units.

In addition, the presently disclosed ligands in the improved additives are selected based on an anticipated high reactive rate to decompose hydrogen peroxide, low impact on fuel cell performance, and low water washability.

The metal component in an additive of the invention includes both suitable metals in elemental form or as part of another molecule. The metal component is also selected to form complexes with the two or more appropriate nitrogen atoms in the ligand component. Preferred metals in the metal component are metals whose complexes with ligand component are good catalyst to decompose hydrogen peroxide in a non-Fenton chemistry as well as good catalyst to catalyze the oxidation of hydrogen with oxygen. The metal component can be any of an elemental metal or a metal alloy, metal oxide, metal salt or any combination thereof. Precursor compounds for the metal component may include Pd, Pt, platinum supported on carbon (Pt/C), $Pt(NH_3)_4(NO_3)_2$, $PtCl_4$, Mn, Co, Rh, Cu, Os, Ni, Ir, Ag, Ti, Ce, Ru, Cr, Zr, Fe, $CeO_2$, $RuO_2$, $WO_3$, $CePO_4$, $CrPO_4$, $AlPO_4$, $CeF_3$, $SiO_2$, $Ce(NO_3)_3 \cdot 6H_2O$, $Ce(SO_4)_2$, $MnO_2$, $Mn_2O_3$, MnO, $MnSO_4$, $MnCl_2$, $Mn(CH_3COO)_2 \cdot 4H_2O$, $Mn(NO_3)_2$, $CoCl_2$, $Co(NO_3)_2$, $CoBr_2$, $Co_3(PO_4)_2$, $Co(CH_3COO)_2$, $CoSO_4$, $Co(H_2PO_4)_2$, $NiF_2$, $NiSO_4$, $NiBr_2$, $NiCl_2$, $Ni_3(PO_4)_2$, $Ni(CH_3COO)_2$, $Ni(OH)_3$, $Ni_2O_3$, NiO, $Fe_3O_4$, $Fe_2O_3$, $FeCl_2$, $FeCl_3$, $Ce(NO_3)_3$, $ZnO_2$, $ZnCl_2$, $Zn(NO_3)_2$, $TiF_2$, $TiF_4$, CuCl, $CuCl_2$, $CuSO_4$, Cu—Ni alloy, Pt—Co alloy, Pt—Au alloy, and $RuO_2$—$Al_2O_3$.

The metal and ligand components can each potentially serve as either a good free radical scavenger or a hydrogen peroxide decomposition catalyst (without forming new radicals) or both. Therefore, each of these chemicals itself can be a good additive for improving durability of a proton conducting membrane. While the presence of either the ligand component or metal component alone increases membrane stability, under certain conditions, it may however adversely affect fuel cell performance. With the present additives, the presence of both the metal component and the ligand component however mitigates the performance loss otherwise seen. Thus, the additives provide durability benefits without performance loss.

Figure 2A:
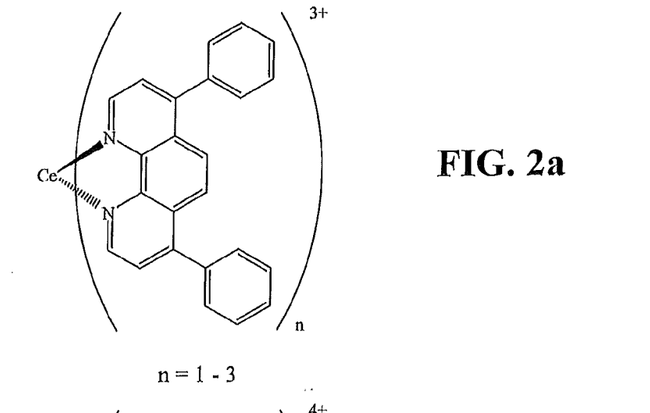
FIGS. 2a-2c show the possible chemical structures of a few of the complex additives of the Examples (C1-C3) respectively.
Figure 2B:
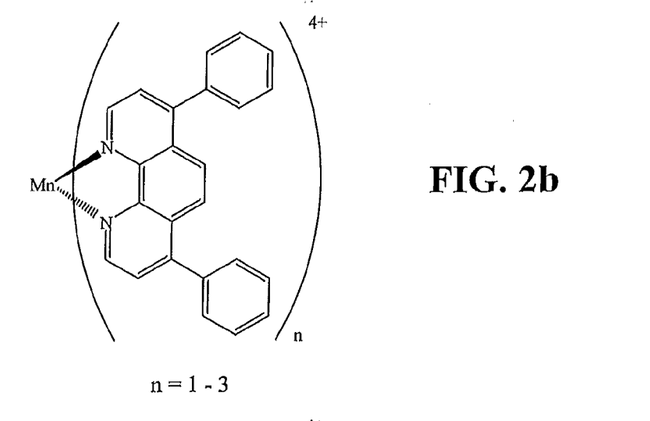
Figure 2C:
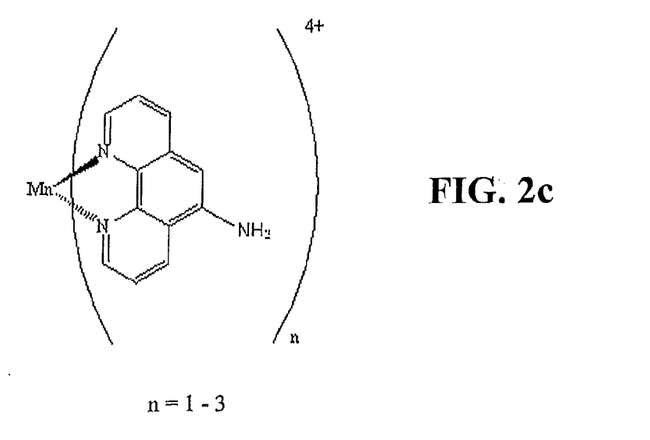

In the (metal)(ligand) additive, various molar ratios of (metal) to (ligand) may be contemplated. Presently preferred molar ratios are in the range from about 1:1 to 1:5. It may for instance be useful to employ an excess of ligand component in the additive in order to deactivate Fenton ion impurities (via forming complexes therewith) in the membrane electrolyte. (Such Fenton ion impurities could originate from, for example, ionomer synthesis or membrane fabrication, or alternatively come from humidifying water streams, gas diffusion layers, or bipolar plates during fuel cell operation.) It should therefore be noted that herein, the molar ratio refers to average amounts of the components present. In practice, the additives are expected to exist as mixtures of one or more (metal)(ligand)$_n$ complexes, as illustrated in FIGS. 2a-2c, where n might be from about 1-3 or more depending on the situation. That is, a given additive may actually comprise a mixture of different amounts of (metal)(ligand)$_1$, (metal)(ligand)$_2$, (metal)(ligand)$_3$, and so forth.

Further, it should also be noted that, depending on the starting materials used, method of synthesis, and polymer type employed, counter ions (such as Cl$^-$) may also be associated with the aforementioned additives. For example, if using MnCl$_2$ as the metal component and bathophenanthroline as the ligand component in a 1:4 ratio, the additive may actually appear as a mixture of Mn(bathophenanthroline)Cl$_2$, Mn(bathophenanthroline)$_2$Cl$_2$ and Mn(bathophenanthroline)$_3$Cl$_2$ where Cl$^-$ is an associated counter ion.

The above-mentioned additives are used to prepare composite PFSA or hydrocarbon electrolyte in order to improve durability and performance of fuel cells. The composite electrolyte comprises a conventional perfluorosulfonic acid ionomer or hydrocarbon ionomer plus a suitable amount of additive.

One method for preparing such a composite is to first synthesize the additive from desired starting ligands and metal precursors. (For instance, synthesis of a complex of ruthenium (II) and bathophenanthroline is described in Langmuir 2008, 24: 11684-11690). The improved electrolyte composite can then be prepared by dissolving the synthesized complex additive in a chosen PFSA ionomer dispersion or hydrocarbon ionomer solution.

Alternatively however, the metal and ligand components or precursors can be dissolved and mixed, at elevated temperature as needed, into an ionomer dispersion or solution directly and thereby provide composite electrolyte material comprising additive directly upon removal of the solvent. Where possible, this procedure is preferred as it saves preparation steps.

Note that it is possible to employ metal precursors that are insoluble in water or solvents such as alcohol per se. This is possible because the metal precursors are soluble in strong acid solutions/dispersions or may react with the ionomer present in a dispersion or solution and then be soluble thereafter. For instance, a metal oxide such as MnO$_2$, may be used (as in Inventive Example C3 below) because it reacts with sulfonic acid (—SO$_3$H) groups in the ionomer dispersion, and can then dissolve into the dispersion. In this case, the additive complex will have SO$_3^-$ as counter ions.

The composite dispersion/solution can then be used to cast membrane electrolyte, to prepare catalyst layers, or otherwise be incorporated into membrane electrode assemblies in any conventional manner as desired. In particular, a membrane can be cast directly from the mixture dispersion/solution. In another embodiment, the dispersion/solution can be spray coated onto the surface of a gas diffusion electrode (GDE). The coated GDE can then be bonded with a proton conducting membrane to make a membrane electrode assembly. In another embodiment, a catalyst can be mixed with the ionomer dispersion/solution containing the additive to make an ink, and then the ink can be coated onto a membrane to make a catalyst coated membrane.

Note that the mechanical strength of cast membranes can be further improved with reinforcement technology. Furthermore, these additives can be immobilized in a porous reinforcement matrix to suppress leakage of the additives from the fuel cell. These additives can also be added into either anode or cathode layer through an ink mixing process and/or spray coating process for fuel cells. Additives can adsorb on the catalyst metal surface blocking the active sites from radical attacking, then inhabit catalyst metal corrosion during fuel cell operations. Then the degradation of the MEA can be significantly slowed down by using these additives in membrane and catalyst layer.

The amount of additive used in the composite electrolyte will depend on several factors. Preferably, a minimal amount of additive is used to obtain these results. When used in the membrane, a typical range might be from about 0.1% to 2% by weight to that of the ionomer. As will be seen in the Examples following, amounts under 1% by weight can be effective. Similar amounts may be considered for use in composite electrolyte coatings on an electrode.

Without being bound by theory, the previously disclosed ligand and metal components have multiple possible functions. The metal and ligand components can each potentially serve as either a good free radical scavenger or a hydrogen peroxide decomposition catalyst (without forming new radicals) or both. Each of the improved additive components individually can be a good additive for improving durability of a proton conducting membrane. Furthermore, the metal component and the ligand component can form complexes, and the formed complexes are good catalysts for decomposing hydrogen peroxide in a non-Fenton chemistry as well as for catalyzing the oxidation of hydrogen with oxygen.

Elements of groups 15 and 16, especially, nitrogen, phosphorus, oxygen and sulphur are the atoms mainly involved in the formation of complexes. In particular, nitrogen and oxygen atoms have been used extensively, especially in reaction with transition metals, which have been investigated due to their catalytic activities. Therefore, it is also expected that certain other small organic molecules, or polymers thereof, in which oxygen atoms serve as the complexing atoms may also serve as suitable ligands in the context of this invention. That is, suitable ligands for the instant invention also include certain small organic molecules, their derivatives or polymers thereof, in which the molecules comprise at least two oxygen atoms, or at least one oxygen and one nitrogen atom, in their structure that are capable of forming a complex with a metal or metal ion.

The oxidation of hydrogen peroxide by metal complexes to produce H$_2$O and O$_2$ is a process associated with electron transfers (D. H. Macartney, Can J Chem 1986, 64: 1936-1942; I. A. Salem, M Elmaazawi, A. B. Zaki, International Journal of Chemical Kinetics, 2000, 32(11): 643-666). It can be expected that π-conjugated metal complexes, which have fast electron transfers, will have high reactivity to decompose hydrogen peroxide. Ligands for these π-conjugated metal complexes include 1,10-phenanthroline, terpyridine and their derivatives. Electron donating and π-conjugation enhancement groups on the ligand, such as phenyl, amino etc, will improve electron transfers in the metal complexes, and consequently increase the reactivity of π-conjugated metal complexes.

The complex additives of the invention may be expected to provide certain durability and performance benefits based on the behavior of the individual metal and ligand components known in the prior art. In addition, certain benefits are expected from the use of complexes of such metal and ligand components. However, use of the present additives provides the unexpected result that prior art benefits can be obtained without the adverse effects. Without being bound by theory, it is believed that this is a result of enhanced π conjugation and fast electron transfers in the metal complexes of the present additive. For instance, the $R_1$ and $R_2$ groups in the present additives have greater electron donating ability than H. Thus, the present additive 1,10-phenanthroline-5-amino has greater electron donating ability than 1,10-phenanthroline. In a like manner, the phenyl groups in bathophenanthroline have greater electron donating capability than H.

The following examples are illustrative of the invention but should not be construed as limiting in any way.

EXAMPLES

Several polymer membrane samples comprising improved additives of the invention were prepared as described below. In addition, several polymer membrane samples were prepared with other additives for comparative purposes.

The membrane samples were all cast from dispersions of Nafion® perfluorosulfonic acid (PFSA) ionomer with equivalent weight EW875. For the membrane samples comprising the additives, appropriate additives or additive components were added into the ionomer dispersion while stirring to obtain transparent ionomer dispersions comprising the additives. The obtained transparent solutions were then degassed, and cast on a carrier. After evaporating the solvent off, the obtained membrane samples were annealed at 150° C. for 1 hour.

The following inventive samples were prepared:

Inventive Example C1

In a vial, 0.0207 grams of bathophenanthroline (1 weight % of PFSA), 0.0065 grams of $Ce(NO_3)_3 \cdot 6H_2O$ (molar ratios of bathophenanthroline to $Ce^{3+}$ was 4:1) and 9.32 grams of PFSA ionomer dispersion (solids concentration 22%) were stirred overnight at 50° C. A (Ce)(bathophenanthroline) additive (hereinafter denoted as C1) was formed in solution and a membrane sample comprising 1% of this C1 additive was cast from the solution. The possible chemical structures of the complexes in the C1 additive are shown in FIG. 2a.

Inventive Example C2

In a vial, 0.0208 grams of bathophenanthroline (1 weight % of PFSA), 0.0018 grams of $MnO_2$ (molar ratios of bathophenanthroline to Mn was 4:1) and 9.36 grams of PFSA ionomer dispersion (solids concentration 22%) were stirred overnight at 50° C. A (Mn)(bathophenanthroline) additive (hereinafter denoted as C2) was formed in solution and a membrane sample comprising 1% of this C2 additive was cast from the solution. The possible chemical structures of the complexes in the C2 additive are shown in FIG. 2b.

Inventive Example C3

In a vial, 0.0138 grams of 1,10-phenanthroline-5-amino (0.5 weight % of PFSA), 0.0015 grams of $MnO_2$ (molar ratios of 1,10-phenanthroline-5-amino to Mn was 4:1) and 12.55 g PFSA ionomer dispersion (solids concentration is 22%) were stirred overnight at 50° C. A (Mn)(1,10-phenanthroline-5-amino) additive (hereinafter denoted as C3) was formed in solution and a membrane sample comprising 0.5% of this C3 additive was cast from the solution. The possible chemical structures of the complexes in the C3 additive are shown in FIG. 2c.

Inventive Example C4

In a vial, 0.0113 grams of terpyridine (0.5 weight % of PFSA), 0.0031 grams of $Pt(NH_3)_4(NO_3)_2$ (molar ratio of terpyridine to Pt was 6:1) and 10.27 grams of PFSA ionomer dispersion (solids concentration is 22%) were stirred overnight at 50° C. A (Pt)(terpyridine) additive (hereinafter denoted as C4) was formed in solution and a membrane sample comprising 0.5% of this C4 additive was cast from the solution.

Inventive Example C5

In a vial, 0.0128 grams of 1,10-phenanthroline-5-amino (0.5 weight % of PFSA), 0.0037 grams of Pt/C (molar ratio of 1,10-phenanthroline-5-amino to Pt was 6:1) and 11.77 grams of PFSA ionomer dispersion (solids concentration 22%) were stirred overnight at 50° C. A (Pt/C)(1,10-phenanthroline-5-amino) additive (hereinafter denoted as C5) was formed in solution and a membrane sample comprising 0.5% of this C5 additive was cast from the solution.

Inventive Example C6

In a vial, 0.0112 grams of 1,10-phenanthroline-5-amino grams (0.5 weight % of PFSA), 0.0066 grams of $PtCl_4$ (molar ratio of 1,10-phenanthroline-5-amino to $Pt^{4+}$ was 3.4:1) and 9.91 grams of PFSA ionomer dispersion (solids concentration 22%) were stirred overnight at 50° C. A (Pt)(1,10-phenanthroline-5-amino) additive (hereinafter denoted as C6) was formed in solution and a membrane sample comprising 0.5% of this C6 additive was cast from the solution.

Sample complexes similar to C2 and C3 above were also made using alternative preparation procedures as follows:

Inventive Example C2*

In a vial, 0.040 grams of bathophenanthroline, 0.0073 grams of $Mn(CH_3COO)_2 \cdot 4H_2O$ (molar ratio of bathophenanthroline to $Mn^{2+}$ was 4:1), and 8 grams of $CH_3CH_2OH$ were stirred at room temperature for 24 h. The solvent was evaporated leaving a water insoluble white solid (Mn)(bathophenanthroline) additive (hereinafter denoted as C2*).

0.0210 gram of this solid additive was then added to 9.54 gram of PFSA ionomer dispersion (solids concentration 22%) and stirred overnight at 50° C. A membrane sample comprising 1% of this C2* additive was cast from the solution. In this example, the additive complex was synthesized prior to adding to the electrolyte solution.

Inventive Example C3*

In a vial, 0.1418 grams of 1,10-phenanthroline-5-amino, 0.044 grams of $Mn(CH_3COO)_2 \cdot 4H_2O$ (molar ratios of 1,10-phenanthroline-5-amino to $Mn^{2+}$ is 4:1), and 6 grams of $CH_3CH_2OH$ were stirred at room temperature for 24 h. The solvent was evaporated leaving a water insoluble yellow solid (Mn)(1,10-phenanthroline-5-amino) additive (hereinafter denoted as C3*).

0.011 grams of this solid additive was then added to 10 grams of PFSA ionomer dispersion (solids concentration 22%) and stirred overnight at 50° C. A membrane sample comprising 0.5% of this C3* additive was cast from the solution. In this example, the additive complex was synthesized prior to adding to the electrolyte solution.

The preceding examples demonstrate that it is possible to make additives and membranes of the invention via different preparation routes. While not identical in some respects, the C2* and C3* additives are chemically quite similar and comprise the same important metal and ligand components as in their C2 and C3 sample counterparts.

Several comparative samples were also obtained or prepared.

Comparative Examples Nafion 875 and NRE211

For testing in fuel cells, a conventional membrane without additive was cast from a dispersion of Nafion® perfluorosulfonic acid (PFSA) ionomer having equivalent weight EW875 (hereinafter referred as Nafion 875). In addition, a commercially available polymer membrane was also obtained, namely DuPont™ Nafion® PFSA NRE211 membrane, hereinafter referred to as NRE211.

A comparative sample additive was also prepared in accordance with the prior art in which the (ligand) component was 1,10-phenanthroline.

Comparative Example C7

In a vial, 0.0146 grams of 1,10-phenanthroline (0.5 weight % of PFSA), 0.0014 grams of $MnO_2$ (molar ratio of 1,10-phenanthroline to Mn was 5:1) and 12.72 grams of PFSA ionomer dispersion (solids concentration 22%) were stirred overnight at 50° C. A (Mn)(1,10-phenanthroline) additive (hereinafter denoted as C7) was formed in solution and a membrane sample comprising 0.5% of this C7 additive was cast from the solution.

And comparative samples comprising only one of the components in the additive of Inventive Example C2 were also prepared:

Comparative Example C2

Ligand

In a vial, 0.0207 grams of bathophenanthroline (1 weight % of PFSA) and 9.32 grams of PFSA ionomer dispersion (solids concentration 22%) were stirred overnight at 50° C. A membrane sample comprising 1% of the C2(ligand) without cerium or manganese was cast from the solution.

Comparative Example C2

Metal

In a vial, 0.0038 grams of $MnO_2$ and 10.19 grams of PFSA ionomer dispersion (solids concentration 22%) were stirred overnight at 50° C. A membrane sample comprising 1% of the C2(metal) without ligand was cast from the solution.

Test fuel cells were then assembled with some of the preceding Inventive samples in order to evaluate i) their performance with respect to that of the conventional Nafion 875 membrane, and ii) their durability with respect to that of the conventional Nafion 875 membrane and the commercially available polymer membrane NRE211.

Individual MEAs were made by bonding the appropriate membrane sample between cathode and anode electrodes. The cathode and anode had Pt loadings of 0.7 $mg/cm^2$ and 0.3 $mg/cm^2$ respectively.

Performance evaluation was carried out using a single cell stack with 50 $cm^2$ of active area hardware. For durability evaluation, a 3-cell stack of the same hardware was used.

Performance was evaluated by obtaining polarization curves (voltage versus current) at different relative humidities for the inlet reactant gases. In all cases, testing was done using hydrogen at the anode, air at the cathode, and at gas stoichiometries of 9 and 12 respectively. All testing was done at 95° C.

Durability or chemical stability of the membrane samples was evaluated under open circuit voltage (OCV) at 30% relative humidity (RH) and 95° C. The supplied gas flow-rates were 3.5 and 11 slpm for hydrogen and air respectively. The OCV of each cell in the stack was monitored over time. In addition, the amount of fluoride released as a result of decomposition of the membrane was determined over time (i.e. the fluoride release rate) by measuring the fluoride ion found in both the cathode and anode outlet water (although in Table 2 and FIG. 3, only the much more significant fluoride amount at the cathode is reported). Testing was stopped when the OCV in any one of the 3 cells in the stack reached 0.8V.

Table 1 gives a summary of the polarization results obtained at 1 $A/cm^2$ current density and at several different RH values.

TABLE 1

| Additive | Amount (% by weight) | Volts at 1 $A/cm^2$ at 95% RH | Volts at 1 $A/cm^2$ at 50% RH | Volts at 1 $A/cm^2$ at 30% RH |
|---|---|---|---|---|
| C1 | 1.0 | .690 | .629 | .525 |
| C2 | 1.0 | .694 | .624 | .537 |
| C3 | 0.5 | .680 | .616 | .522 |
| C4 | 0.5 | .690 | .628 | .530 |
| C5 | 0.5 | .683 | .623 | .523 |
| C6 | 0.5 | .695 | .621 | .522 |
| None (Nafion 875 only) | 0 | .691 | .620 | .495 |
| C7 | 0.5 | .682 | .611 | .499 |
| C2(ligand) | 1 | .672 | .603 | .483 |
| C2(metal) | 1 | .686 | .616 | .481 |

As is evident from Table 1, at 30% RH, all of the cells made with membranes of the invention showed significantly better performance than the Nafion 875 membrane. It is also noteworthy that the cell made with sample C3, C4, C5 and C6 having only 0.5% additive showed a similar performance improvement to those of cells made with samples C1 and C2 having 1% additive present. Also noteworthy is that the observed performance gain depends on the relative humidity during testing. For instance, the cells with additives of the invention showed similar performance as that made with conventional Nafion 875 at 50% RH and 95% RH.

The data in Table 1 also shows that, at the 30% RH level, neither of the components in additive C2 on their own provides the performance improvement seen with C2 itself. In particular, the ligand component in C2, as an additive on its own, does not provide the performance improvement seen in sample C2. (In fact, there appears a slight performance drop in cells with either C2(ligand) or C2(metal) additives on their own when compared to the cell with the conventional Nafion 875 membrane.

Figure 3:
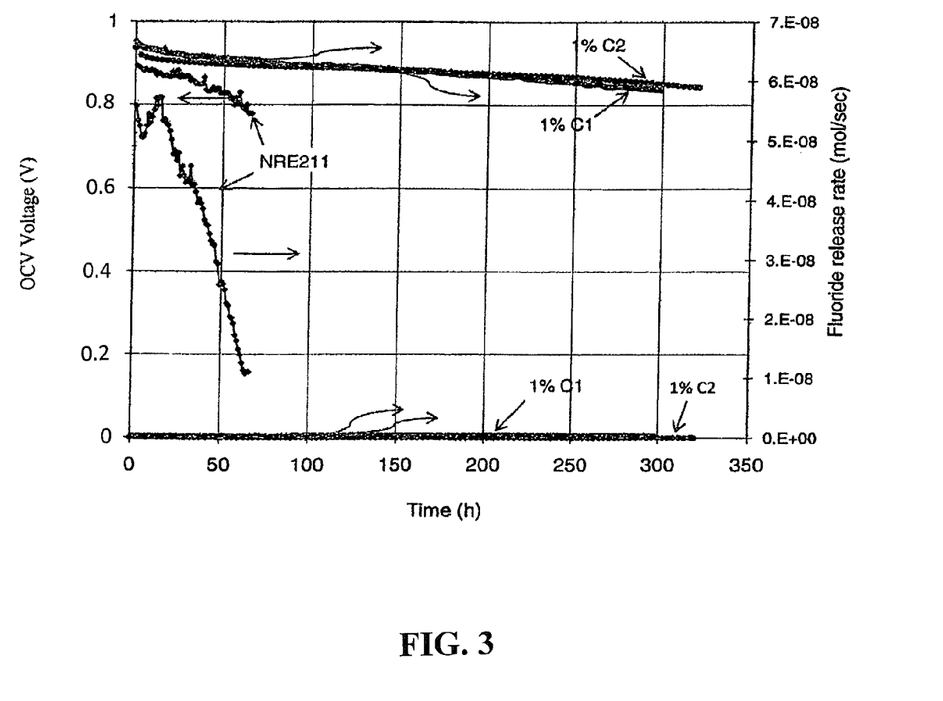
FIG. 3 plots results of open circuit voltage and fluoride release rate at the cathode over time for some of the Examples.

Durability results for the samples tested are provided in Table 2 and in FIG. 3. Table 2 below tabulates the length of time that all the cells in the test stack were able to maintain an OCV>0.8V, the average OCV decay rate, and also the average fluoride release rate at the cathode.

TABLE 2

| Additive | Amount (% by weight) | OCV lifetime (hours) | Average fluoride release rate at the cathode (mol/sec) | Average OCV decay rate (mV/h) |
|---|---|---|---|---|
| None (NRE211 only) | 0 | 66 | $3.8 \times 10^{-8}$ | 1.5 |
| None (Nafion 875 only) | 0 | 54 | $5.00 \times 10^{-9}$ | 1.6 |
| C1 | 1 | 298 | $2.52 \times 10^{-10}$ | 0.3 |
| C2 | 1 | 320 | $6.44 \times 10^{-12}$ | 0.2 |
| C3 | 0.5 | 306 | $3.40 \times 10^{-11}$ | 0.2 |

The results in Table 2 show a marked improvement in durability for MEAs comprising the C1, C2 and C3 membranes when compared to that comprising the conventional NRE211 and Nafion 875 membranes. The C1, C2, and C3 based stacks had OCV lifetimes about 5-6 times longer than that of NRE211 and Nafion 875 based stacks. And the fluoride release rates for the C1, C2, and C3 based stacks were over 2 to 3 orders of magnitude less than that of the NRE211 and Nafion based stacks.

FIG. 3 shows plots of OCV and fluoride release rate at the cathode for the NRE211, C1 and C2 based stacks over time. (OCV in volts appears on the left hand Y axis, cathode fluoride release rate in mol/sec on the right hand Y axis and time in hours along the X axis.) The marked differences in both OCV and fluoride release rate between the fuel cell stacks comprising additives C1 or C2 and the stack made with conventional NRE211 membrane are clearly evident. The OCV decay rate for the C1 and C2 based stacks were 0.3 mV/h and 0.2 mV/h respectively, both of which are about 5 and 6 times lower respectively than the 1.5 mV/h for the NRE211 based stack (again this was at 30% RH and 95° C.). Although not shown in FIG. 3, the OCV and fluoride release rate plots for the C3 stack are very similar to those for stacks C1 and C2. The OCV plot for the comparative Nafion 875 stack is very similar to that for the other comparative NRE211 stack. The fluoride release rate plot for the Nafion 875 stack was substantially less than that for the NRE211 stack but was also substantially more than the inventive C1 and C2 stacks.

The preceding Examples illustrate that both performance under low RH conditions and durability of proton conducting membranes are improved with use of the inventive additives.

In addition, an experiment was performed to study the effect of incorporating such additives in the catalyst layer as well. Two additional samples were prepared.

Inventive Example with C3 in Both Membrane and Cathode Catalyst Layer 1 wt % of the aforementioned C3 additive was stirred with Nafion® perfluorosulfonic ionomer (EW 950) dispersion to obtain a transparent ionomer dispersion comprising the additive. Then, carbon supported Pt catalyst was mixed with the dispersion in a solids weight ratio of 33/67 (Nafion/carbon supported Pt) to form a catalyst ink. The ink was coated on polytetrafluoroethylene sheet and then was transferred to an Inventive Example C3 membrane sample to make a unitary cathode catalyst coated membrane electrolyte assembly with a Pt loading of 0.27 mg/cm$^2$.

A complete MEA was then made by appropriately applying a conventional anode gas diffusion electrode with an anode Pt loading of 0.3 mg/cm$^2$ and a conventional gas diffusion layer for the cathode to the aforementioned unitary cathode catalyst coated membrane electrolyte assembly. The MEA was bonded at 150° C. under pressure for 2.5 minutes.

For comparison purposes, a similar MEA with similar Pt loadings and components was prepared as in the preceding except that no C3 additive was used in the membrane electrolyte nor in the cathode catalyst layer.

A fuel cell stack comprising each of these two MEA samples was prepared and subjected to accelerated cycle life testing to stress test the cathode catalyst layer in particular. This involved subjecting the individual cells to voltage cycling between 0.6 and 1 volts using a square wave cycle of 2 sec and 10 sec duration respectively. Using the stack construction as a common test vehicle for both cells ensured that other test conditions were the same for both MEAs. In the cycle testing, air and hydrogen were used as reactant gases, with both supplied to the stack at 100% relative humidity. The operating temperature of the stack was 80° C.

Figure 4:
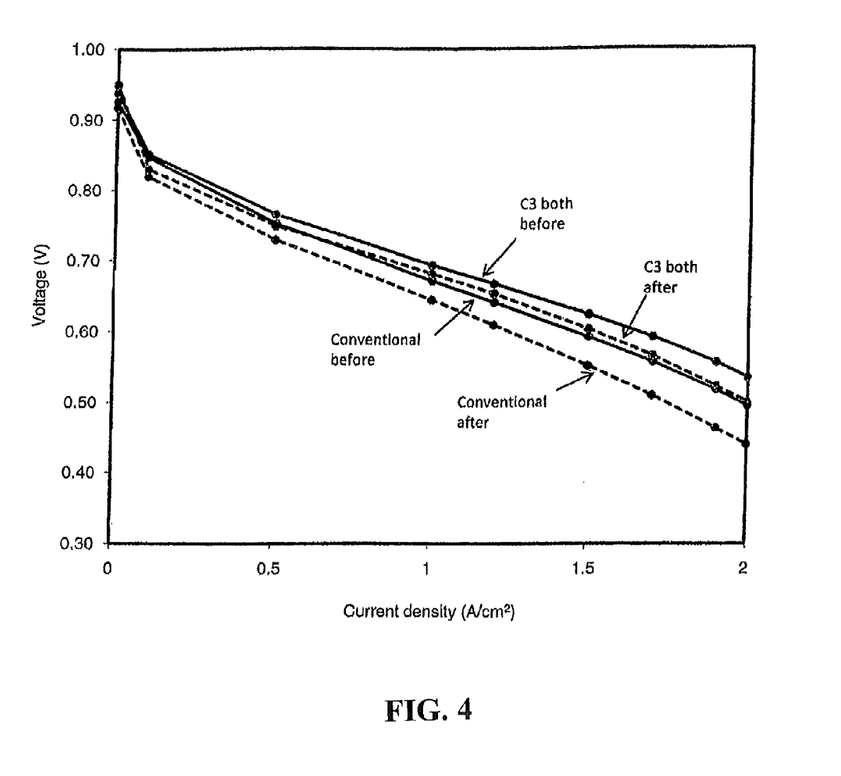
FIG. 4 compares the voltage versus current density (polarization) curves, both before and after cycle testing, of the example comprising additive in both the cathode catalyst layer and membrane electrolyte to the example comprising a conventional MEA.

The voltage versus current density characteristics of each MEA were determined prior to cycle testing and then again after 20,000 cycles. FIG. 4 shows the voltage versus current density (polarization) curves for each MEA before and after cycle testing. Here, the MEA with C3 additive in both the membrane and cathode catalyst layer is denoted "C3 both". The MEA without additive is denoted "conventional". As is evident in FIG. 4, the MEA with additive in both membrane and cathode catalyst layer showed a somewhat better polarization curve than the conventional MEA before cycle testing was performed. In addition however, there was only a loss of about 26 mV in voltage after cycle testing at 1.7 A/cm$^2$ for the former MEA while there was a more substantial loss of about 46 mV for the latter. Further, both MEAs were removed after cycle testing, were sectioned, and viewed using a scanning electron microscope. A distinct thin band of Pt was observed in the membrane of the conventional MEA (approx ⅕ of the membrane thickness from the cathode catalyst layer). No such band was observed in the MEA comprising the C3 additive in both the membrane and the cathode catalyst layer. The band of Pt seen after cycling in the conventional MEA arises from dissolution of the Pt catalyst in the cathode layer. The presence of C3 additive in the inventive MEA appears to improve results on cycle life testing and to inhibit dissolution of the cathode catalyst.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:
1. A membrane electrode assembly for a solid polymer electrolyte fuel cell comprising
an anode catalyst layer,
a membrane electrolyte,
a cathode catalyst layer, and a proton conducting composite polymer electrolyte comprising a proton conducting ionomer and an amount of a metal-ligand complex additive wherein:

the metal in the complex is selected from the group consisting of metals, metal alloys, metal oxides, metal salts and combinations thereof; and the ligand in the complex comprises a molecule or polymer thereof wherein the chemical structure of the molecule is selected from the group consisting of:

wherein $R_1$, $R_3$ and $R_4$ are selected from the group consisting of H, $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH, and wherein X is H, COOH, $PO(OH)_2$ or $SO_3H$ and n is an integer from 0 to 10; and wherein $R_2$ is selected from the group consisting of $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH, and wherein X is H, COOH, $PO(OH)_2$ or $SO_3H$ and n is an integer from 0 to 10.

2. The membrane electrode assembly of claim 1 wherein the metal in the complex comprises Mn, Ce, Co, Fe, Cu, Pd, Pt, Pt supported on carbon, Pt—Co, or an ion thereof.

3. The membrane electrode assembly of claim 1 wherein $R_1$ is an amino or phenyl group.

4. The membrane electrode assembly of claim 1 wherein $R_2$ is an amino or phenyl group.

5. The membrane electrode assembly of claim 1 wherein the ligand is bathophenanthroline, 1,10-phenanthroline-5-amino, or terpyridine.

6. The membrane electrode assembly of claim 5 wherein the metal is Ce, Mn, Pt, or Pt supported on carbon.

7. The membrane electrode assembly of claim 1 wherein the molar ratio of metal to ligand in the complex is from about 1:1 to 1:5.

8. The membrane electrode assembly of claim 1 wherein the amount of the metal-ligand complex additive in the composite polymer electrolyte is greater than or about 0.5% by weight of the proton conducting ionomer.

9. The membrane electrode assembly of claim 8 wherein the amount of the metal-ligand complex additive in the composite polymer electrolyte is from about 0.5% to about 1% by weight of the proton conducting ionomer.

10. The membrane electrode assembly of claim 1 wherein the proton conducting ionomer is perfluorosulfonic acid ionomer or hydrocarbon ionomer.

11. The membrane electrode assembly of claim 1 wherein the cathode catalyst layer comprises the composite polymer electrolyte.

12. A solid polymer electrolyte fuel cell comprising a membrane electrode assembly comprising:
- an anode catalyst layer,
- a membrane electrolyte,
- a cathode catalyst layer, and
- a proton conducting composite polymer electrolyte comprising a proton conducting ionomer and an amount of a metal-ligand complex additive wherein:
- the metal in the complex is selected from the group consisting of metals, metal alloys, metal oxides, metal salts and combinations thereof; and
- the ligand in the complex comprises a molecule or polymer thereof wherein the chemical structure of the molecule is selected from the group consisting of:

wherein $R_1$, $R_3$ and $R_4$ are selected from the group consisting of H, $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH, and wherein X is H, COOH, $PO(OH)_2$ or $SO_3H$ and n is an integer from 0 to 10; and wherein $R_2$ is selected from the group consisting of $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH, and wherein X is H, COOH, $PO(OH)_2$ or $SO_3H$ and n is an integer from 0 to 10.

* * * * *